United States Patent
Miki et al.

(10) Patent No.: US 9,591,628 B2
(45) Date of Patent: Mar. 7, 2017

(54) BASE STATION APPARATUS AND COMMUNICATION CONTROL METHOD

(75) Inventors: Nobuhiko Miki, Tokyo (JP); Tetsushi Abe, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 743 days.

(21) Appl. No.: 13/704,252

(22) PCT Filed: Jun. 14, 2011

(86) PCT No.: PCT/JP2011/063605
§ 371 (c)(1),
(2), (4) Date: Jan. 16, 2013

(87) PCT Pub. No.: WO2011/162131
PCT Pub. Date: Dec. 29, 2011

(65) Prior Publication Data
US 2013/0107836 A1    May 2, 2013

(30) Foreign Application Priority Data
Jun. 21, 2010    (JP) .................................. 2010-141018

(51) Int. Cl.
*H04W 72/04*    (2009.01)
*H04L 5/00*    (2006.01)

(52) U.S. Cl.
CPC ......... *H04W 72/042* (2013.01); *H04L 5/0091* (2013.01)

(58) Field of Classification Search
None
See application file for complete search history.

(56) References Cited

U.S. PATENT DOCUMENTS 8,054,893 B2    11/2011 Mizusawa
2011/0237283 A1*    9/2011 Shan et al. .................... 455/509
(Continued)

FOREIGN PATENT DOCUMENTS

JP    2008-136132 A    6/2008

OTHER PUBLICATIONS

Office Action issued in corresponding Japanese Application No. 2010-141018, mailed Aug. 13, 2013 (4 pages).
(Continued)

*Primary Examiner* — Rhonda Murphy
(74) *Attorney, Agent, or Firm* — Osha Liang LLP

(57) ABSTRACT

In order to reduce radio resources allocated to PDCCHs and improve the data rate even when a plurality of component carriers are aggregated into a wide band, the present invention provides a base station apparatus having: a downlink control information generation section (306) configured to generate downlink control information (DCI) to demodulate PDSCHs that are sent independently in respective component carriers (CCs) allocated to a user terminal; and a transmitting section configured to transmit a PDCCH containing the downlink control information (DCI). The downlink control information (DCI) generated by the downlink control information generation section (306) is added with identification information (CIF) that is used to demodulate the PDSCHs assigned to the component carriers and is capable of identifying each of the component carriers.

7 Claims, 13 Drawing Sheets

(56) References Cited

U.S. PATENT DOCUMENTS

| | | | | |
|---|---|---|---|---|
| 2012/0046027 A1* | 2/2012 | Baker | ............... | H04L 5/0092 |
| | | | | 455/422.1 |
| 2012/0113941 A1* | 5/2012 | Chung et al. | ............... | 370/329 |
| 2013/0121316 A1* | 5/2013 | Skov | ............... | H04L 5/0007 |
| | | | | 370/336 |
| 2014/0219213 A1* | 8/2014 | Ko et al. | ............... | 370/329 |
| 2015/0365949 A1* | 12/2015 | Kim | ............... | H04L 5/0091 |
| | | | | 370/329 |

OTHER PUBLICATIONS

International Search Report issued in PCT/JP2011/063605 mailed Aug. 9, 2011 (3 pages).
NTT Docomo, et al.; "Downlink L1/L2 Control Signaling Channel Structure: Coding"; 3GPP TSG RAN WG Meeting #47bis, R1-070103; Sorrento, Italy; Jan. 15-19, 2007 (17 pages).
Decision to Grant a Patent in counterpart Japanese Patent Application No. JP2010-141018 issued Jan. 7, 2014 (4 pages).

* cited by examiner

| CIF | Number of Available CCs | | | |
|---|---|---|---|---|
| | 2 | 3 | 4 | 5 |
| 000 | CC0 | CC0 | CC0 | CC0 |
| 001 | CC1 | CC1 | CC1 | CC1 |
| 010 | CC0 + CC1 | CC2 | CC2 | CC2 |
| 011 | N/A | CC0 + CC1 | CC3 | CC3 |
| 100 | N/A | CC0 + CC2 | Bundling CC set $N_1$ | CC4 |
| 101 | N/A | CC1 + CC2 | Bundling CC set $N_2$ | Bundling CC set $N_1$ |
| 110 | N/A | CC0 + CC1 + CC2 | Bundling CC set $N_3$ | Bundling CC set $N_2$ |
| 111 | N/A | N/A | Bundling CC set $N_4$ | Bundling CC set $N_3$ |

FIG. 4

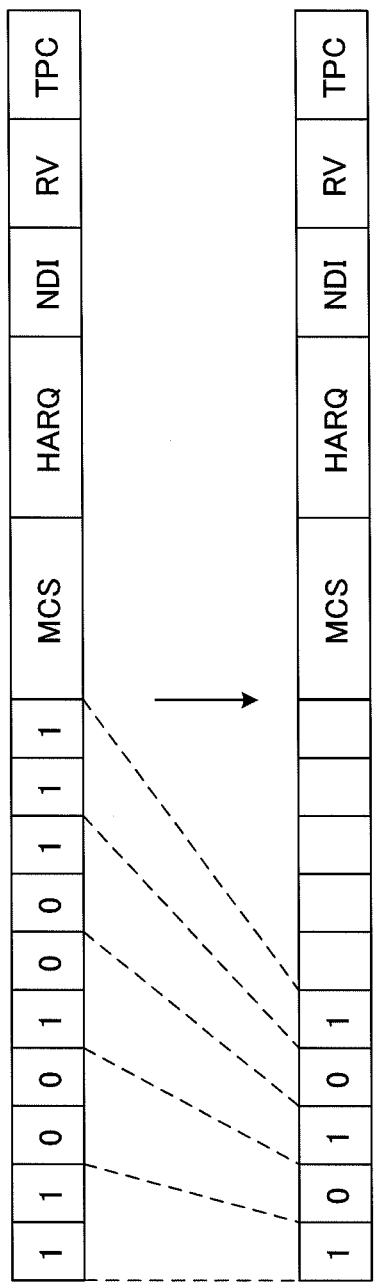

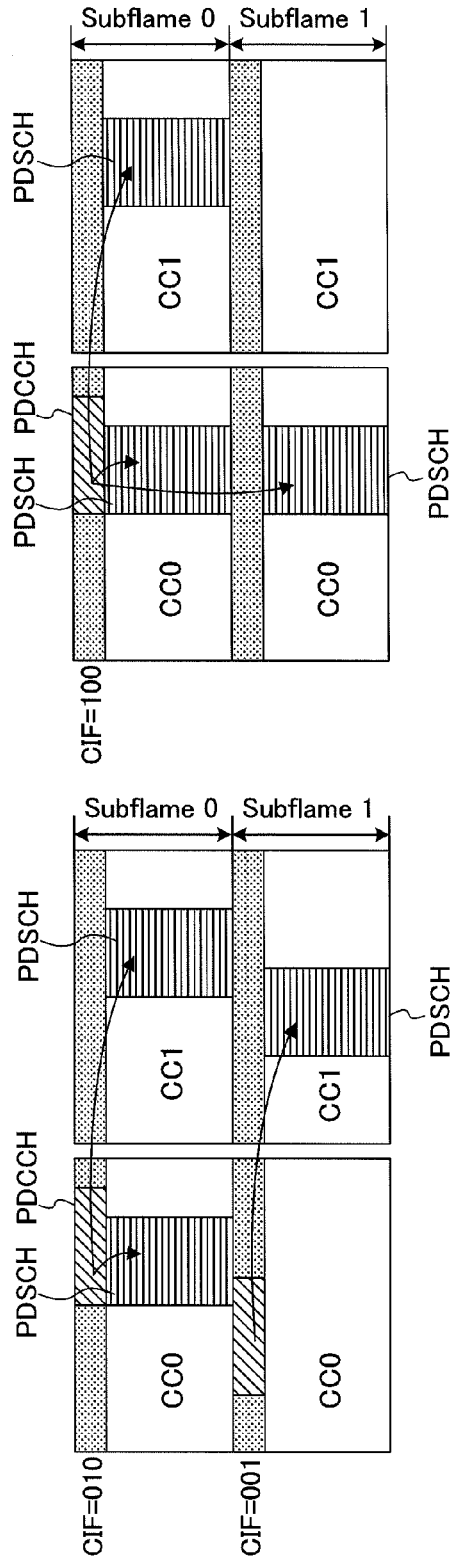
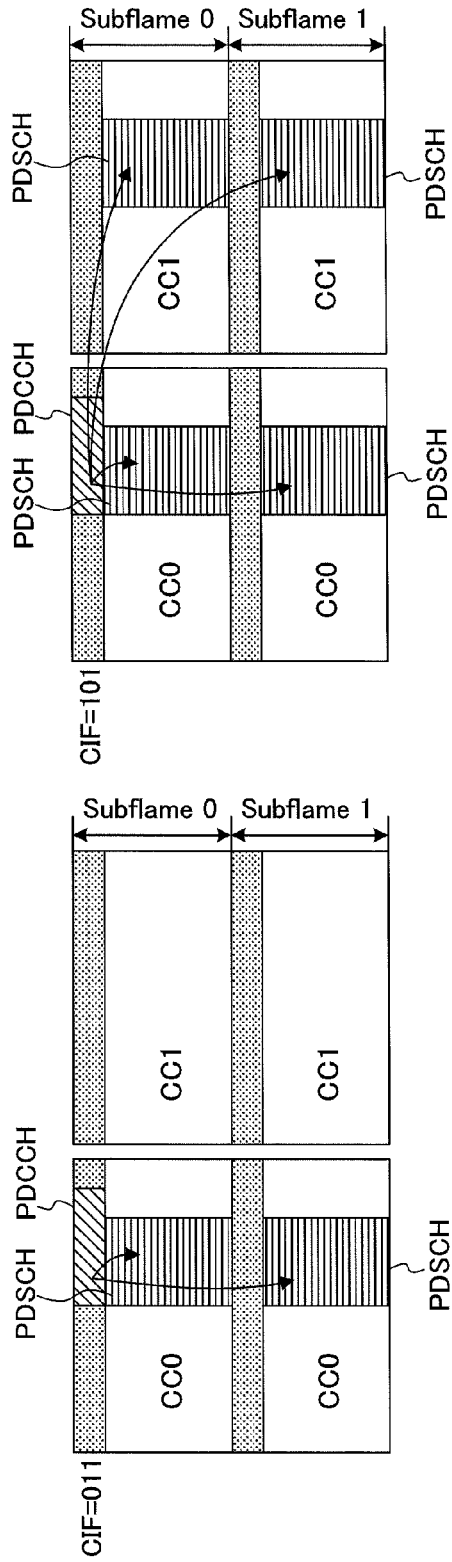

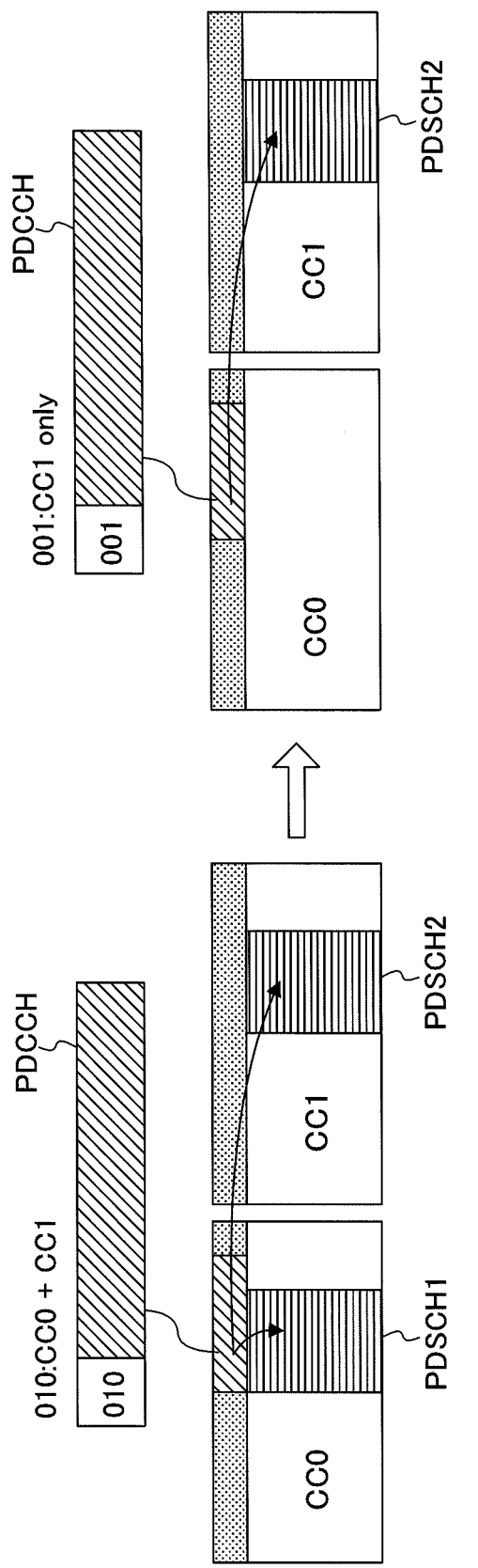

BASE STATION APPARATUS AND COMMUNICATION CONTROL METHOD

TECHNICAL FIELD

The present invention relates to a base station apparatus and a communication control method in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long term evolution (LTE) has been under study.

In a third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). For example, in the LTE-A system, there is a plan to extend the maximum system band of 20 MHz specified in the LTE system up to about 100 MHz.

The LTE system is a system where communication is performed with one or more physical channels shared between plural mobile station apparatuses UE both on the uplink and on the downlink. A channel shared by plural mobile station apparatuses UE is generally referred to as "shared channel" (or it may be called data channel) and in the LTE system, there are uplink PUSCH (Physical Uplink Shared CHannel) and downlink PDSCH (Physical Downlink Shared CHannel).

In this LTE system, in the communication system using the shared channels, it is necessary to inform to which a mobile station apparatus UE the above-mentioned shared channel is assigned per transmission time interval (TTI) (subframe for LTE) by signaling. A downlink control channel for this signaling is defined as a PDCCH (Physical Downlink Control CHannel).

Downlink control information transmitted in this PDCCH includes, for example, downlink scheduling information (see Non Patent Literature 1). This downlink scheduling information includes, for example, allocation information of downlink resource blocks, identification information of a mobile station apparatus UE, the number of streams, information of precoding vector, data size, modulation scheme, information of HARQ (Hybrid Automatic Repeat reQuest). In the mobile station apparatus UE, radio resources to which PDSCHs directed to the mobile station apparatus are assigned are recognized by decoding the PDCCH, thereby being able to recode the radio resources.

CITATION LIST

Non Patent Literature

Non-Patent Literature 1: R1-070103, Downlink L1/L2 Control Signaling Channel Structure: Coding

SUMMARY OF THE INVENTION

Technical Problem

Now, in the LTE-A system, there is an agreement to widen the band by gathering and grouping a plurality of component carriers (carrier aggregation). If the LTE system specifications are adopted in the radio communications in the widened system band like in the LTE-A system, the above-mentioned PDCCH needs to be transmitted per component carrier. That is, it is necessary to transmit the PDSCH and PDCCH for demodulation of the PDSCH in the same component carrier. However, if the PDCCH is transmitted per component carrier as mentioned above, there is an increase in radio resources to be allocated to PDCCHs and it becomes difficult to improve the data rate (frequency use efficiency) problematically.

The present invention was carried out in view of the foregoing and aims to provide a base station apparatus and a communication control method capable of reducing the radio resources to allocate to the PDCCDs and improving the data rate even when the plural component carriers are aggregated into a broader band.

Solution to Problem

An aspect of the present invention is a base station apparatus comprising: a downlink control information generation section configured to generate downlink control information to demodulate data channels that are sent independently in respective fundamental frequency blocks allocated to a user terminal; and a transmitting section configured to transmit a downlink control channel containing the downlink control information, wherein the downlink control information generated by the downlink control information generation section is added with identification information that is used to demodulate the data channels assigned to the fundamental frequency blocks and is capable of identifying each of the fundamental frequency blocks.

According to the base station apparatus of the present invention, the downlink control information is generated with the addition of identification information that is used for demodulating a plurality of data channels assigned to two or more fundamental frequency blocks and is capable of identifying the fundamental frequency blocks. With this configuration, there is no need to generate downlink control information on a per-fundamental frequency block basis and send the downlink control channel, and it is possible to reduce the radio resources assigned to downlink control channels (PDCCHs) and improve the data rate even when a plurality of fundamental frequency blocks (component carriers) are aggregated into a wide band.

Another aspect of the present invention is a communication control method comprising: a generating step of generating downlink control information to demodulate data channels that are sent independently in respective fundamental frequency blocks allocated to a user terminal; and a transmitting step of transmitting a downlink control channel containing the downlink control information, wherein the downlink control information generated in the generating step is added with identification information that is used to demodulate the data channels assigned to the fundamental frequency blocks and is capable of identifying each of the fundamental frequency blocks.

According to the communication control method of the present invention, the downlink control information is generated with the addition of identification information that is used for demodulating a plurality of data channels assigned to two or more fundamental frequency blocks and is capable of identifying the fundamental frequency blocks. With this configuration, there is no need to generate downlink control information on a per-fundamental frequency block basis and send the downlink control channel, and it is possible to reduce the radio resources assigned to downlink control channels (PDCCHs) and improve the data rate even when a plurality of fundamental frequency blocks (component carriers) are aggregated into a wide band.

Technical Advantage of the Invention

According to the present invention, it is possible to reduce the radio resources to allocate to the PDCCDs and improve the data rate even when the plural component carriers are aggregated into a broader band.

BRIEF DESCRIPTION OF DRAWINGS

FIG. 4 is a diagram illustrating an example of a CIF table used in the communication control method according to the present invention;

FIG. 6 provides diagrams for explaining a compression method of RA field information in the DCI in the above-mentioned base station apparatus;

FIG. 7 provides diagrams for explaining a method of providing notification of component carriers and/or subframes to which PDSCHs are assigned, with use of a CIF in the above-mentioned base station apparatus;

FIG. 8 provides diagrams for explaining a method of retransmitting PDSCHs in the above-mentioned base station apparatus;

DESCRIPTION OF EMBODIMENTS

Figure 1:
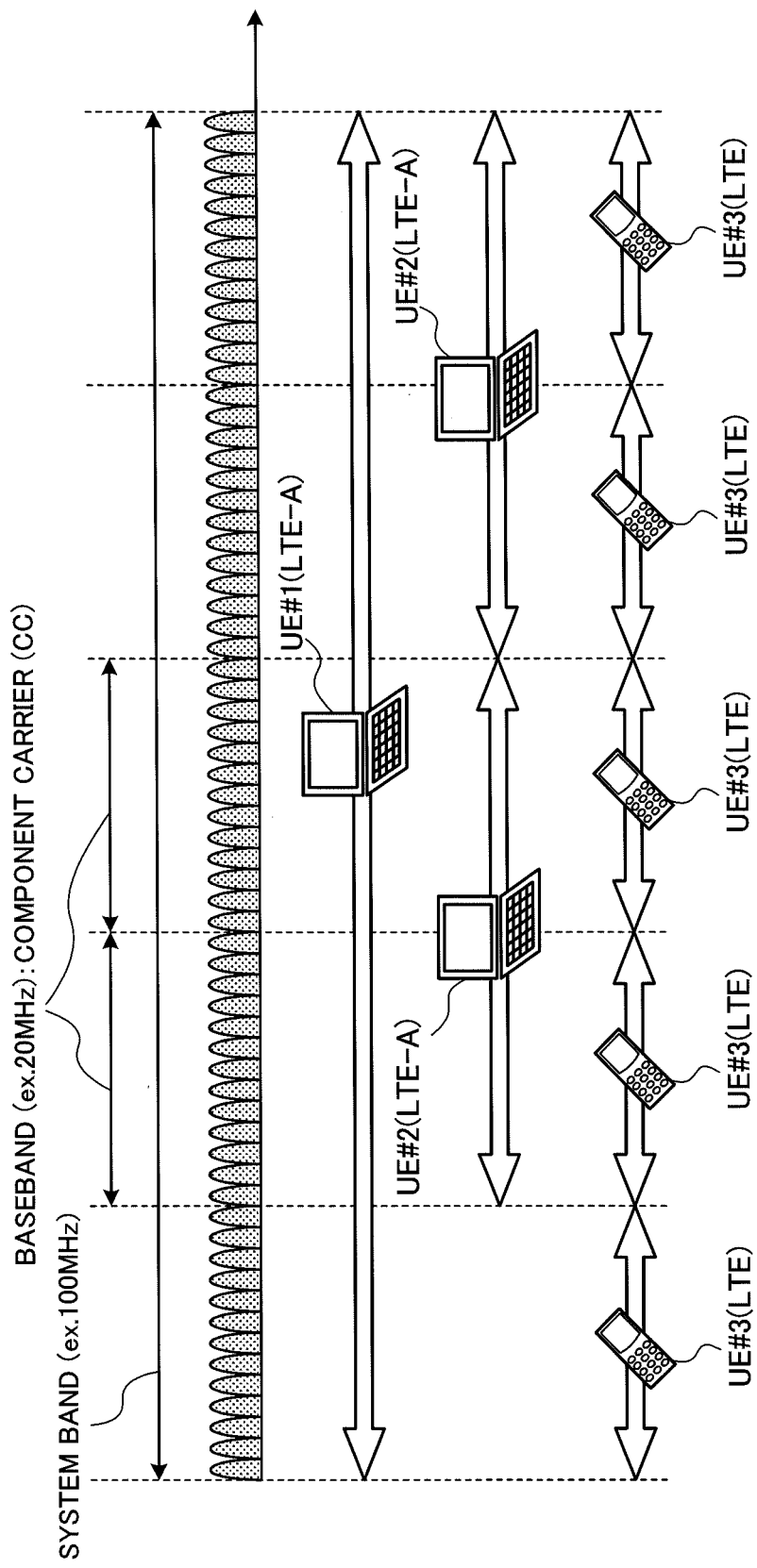
FIG. 1 is a diagram illustrating a hierarchical band width configuration defined in LTE-A.

FIG. 1 is a diagram for illustrating a hierarchical band width configuration defined in LTE-A. The example illustrated in FIG. 1 is of a hierarchical band width configuration where there coexist an LTE system and an LTE-A system. In the LTE system, radio communication is performed using a variable system band. In the LTE-A system, radio communication is performed using a variable system band which is changed by adding or reducing fundamental frequency blocks (fundamental unit), each fundamental frequency block being a system band of the LTE system (for example, maximum system band).

In the LTE-A system, for example, radio communication is performed using a variable system bandwidth of 100 MHz or less and in the LTE system, radio communication is performed using a system bandwidth of 20 MHz or less. The system band for the LTE-A system is at least one fundamental frequency block, where the system band of the LTE system is one unit (fundamental frequency block). In the LTE-A system, the fundamental frequency block is called "component carrier" (CC). This coupling of plural component carriers into a broader band is referred to as "carrier aggregation".

For example, in FIG. 1, the system band of the LTE-A system is a system band including bands of five component carriers (20 MHz×5=100 MHz), where the system band (base band: 20 MHz) of the LTE system is one component carrier. In FIG. 1, a mobile station apparatus UE (User Equipment) #1 is a mobile station apparatus supporting the LTE-A system (and also supporting the LTE system) and has a system band of up to 100 MHz. UE #2 is a mobile station apparatus supporting the LTE-A system (and also supporting the LTE system) and has a system band of up to 40 MHz (20 MHz×2=40 MHz). UE #3 is a mobile station apparatus supporting the LTE system (and not supporting the LTE-A system) and has a system band of up to 20 MHz (base band).

In radio communication in the thus widened system band, there may occur a communication environment where some component carriers suffers from large interference from other cells while other component carriers are hardly affected by the interference. In view of this, there has been considered a scheme of allocating downlink control information (DCI) relating to the shared data channel (PDSCH/PUSCH) sent in a component carrier of strong interference from another cell, to another component carrier less affected by the interference. In the following, for convenience of explanation, a scheme where a PDCCH of a component carrier for sending a PDSCH is sent in another component carrier is called "cross-carrier scheduling".

As a method for realizing such cross-carrier scheduling, there has been considered a method of adding, to downlink control information (DCI), a carrier indicator field (hereinafter referred to as "CIF") indicating to what component carrier (hereinafter referred to as "CC") a PDSCH is assigned and providing notification of the CC to which the PDSCH is assigned with use of bit information that make up the CIF. In other words, a common CIF table is held between a mobile station apparatus and a base station apparatus and the bit information of the CIF notified of from the base station apparatus is used to specify the CC to which the PDSCH is assigned. Here, this CIF is agreed to be composed of three bits.

Figure 2B:
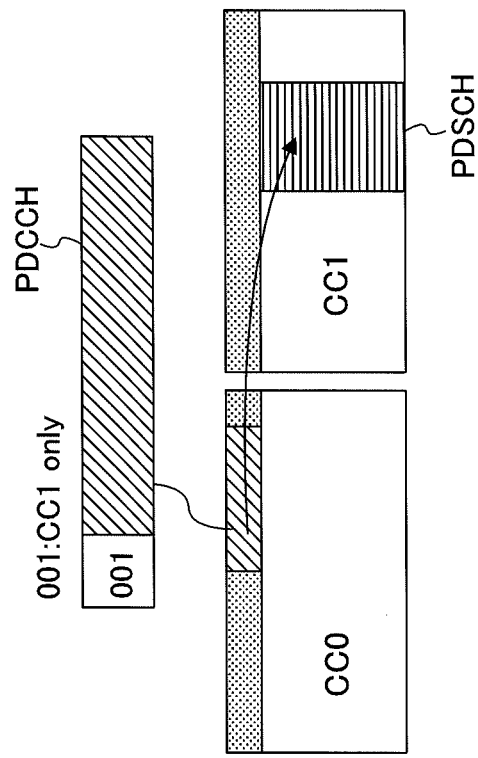
FIG. 2 provides diagrams for explaining a method of providing notification of component carriers to which PDSCHs are assigned, with use of a CIF.
Figure 2A:
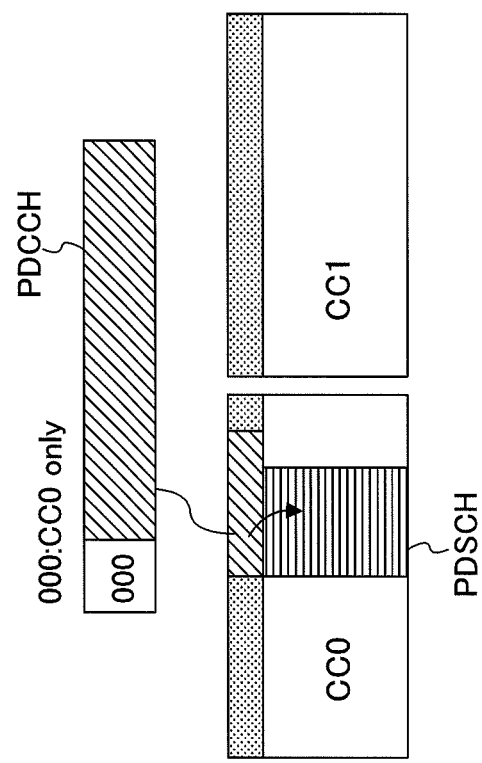

Here, with reference to FIG. 2, description is made about the method of providing notification of a CC to which the PDSCH is assigned, with use of a CIF. FIG. 2 provides diagrams for explaining the method of providing notification of the CC to which the PDSCH is assigned, with use of the CIF. FIG. 2A illustrates a case where the PDSCH and the PDCCH for demodulating the PDSCH are sent in the same CC, while FIG. 2B illustrates a case where the PDCCH for demodulating the PDSCH is sent in an adjacent CC. Here, in FIG. 2, it is assumed that the system band is made up of two CCs.

In the examples illustrated in FIG. 2, when the bit information of the CIF is "000", the PDSCH and PDCCH are assigned to the same CC (FIG. 2A) and when the bit information of the CIF is "001", the PDSCH is assigned to a CC adjacent to a CC where the PDCCH is assigned (FIG. 2B). In the mobile station apparatus, this CIF is decoded thereby to identify the CC to which PDSCH for the subject apparatus is assigned, based on the above-mentioned CIF table.

However, even when the CC to which the PDSCH is assigned is notified of by the CIF, if the PDSCHs and the PDCCHs for demodulating the PDSCHs are equal in number, it is difficult to reduce radio resources allocated to the PDCCHs and also difficult to increase the data rate frequency use efficiency). The present inventors has noted that improvement of the data rate is prevented by the fact that the PDSCHs and the PDCCH for demodulating the PDSCHs are equal in number and achieved the present invention.

That is, according to a communication control method according to the present invention, DCI is generated to include a CIF which is used for demodulating a plurality of PDSCHs assigned to two or more CCs and is identification information capable of identifying the two or more CCs and a PDCCH is sent with this DCI. With this method, as the mobile station apparatus can be notified of the two or more CCs to which the PDSCHs are assigned, with use of the single PDCCH, it is possible to reduce the radio resources allocated to the PDCCH and improve the data rate even in the case when a plurality of CCs are aggregated into a broad band.

Figure 3:
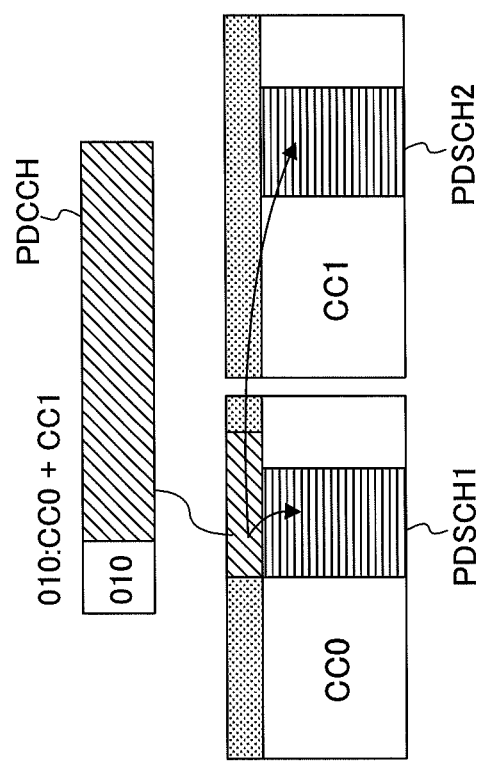
FIG. 3 is a diagram for explaining a method of providing notification of component carriers to which PDSCHs are assigned, with use of a CIF, in a base station apparatus to which a communication control method according to the present invention is applied.

FIG. 3 is a diagram for explaining the method of providing notification of the CCs to which the PDSCHs are assigned, by the CIF in the base station apparatus to which the communication control apparatus of the present invention is applied. In the example illustrated in FIG. 3, when the CIF bit information is "010", two PDSCHs (PDSCH1, PDSCH2) are assigned to the same CC as the PDCCH (CC0) and to an adjacent CC (CC1), respectively. In the mobile station apparatus, this CIF is decoded thereby to be able to recognize the two CCs to which the PDSCH for the subject apparatus are assigned, with reference to the CIF table described later.

FIG. 4 is a diagram for illustrating an example of the CIF table utilized in the communication control method according to the present invention. In the CIF table illustrated in FIG. 4, CCs to which PDSCHs are assigned are defined in association with the number of available CCs for radio communication and the bit information that makes up the CIF. In FIG. 4, the CIF table contains the number of CCs of 2 to 5 (CC0 to CC4). In the following description, for convenience of explanation, it is assumed that a PDCCH is assigned to the CC0. Here, this CIF table is held in both of the base station apparatus to which the communication control method according to the present invention is applied and the mobile station apparatus that performs radio communication with this base station apparatus.

The part enclosed by the heavy line illustrated in FIG. 4 indicates CCs which is assigned to the bit information of the CIF when the PDCCHs and the PDSCHs are equal in number. For example, when the CC number is 2, at CIF=000, the CC to which the PDSCH is assigned is CC0, and at CIF=001, the CC to which the PDSCH is assigned is an adjacent CC1. Now, the examples illustrated in FIGS. 2A and 2B are of these cases. And, when the CC number is 3, at CIF=010, the CC to which the PDSCH is assigned is CC2 next to CC1 (two CCs away). Further, when the CC number is 4, at CIF=011, the CC to which the PDSCH is assigned is CC3 next to CC2 (three CCs away). And, when the CC number is 5, at CIF=100, the CC to which the PDSCH is assigned is CC4 next to CC3 (four CCs away).

In the CIF table illustrated in FIG. 4, when the CC number is 2, the bit information of CIF=010 or later (that is, 010, 011, 100, 101, 110, 111) remains as bit information with no CC defined. In the same manner, it is seen that when the CC number is 3, the bit information of CIF=011 or later remains, when the CC number is 4, the bit information of CIF=100 or later remains and when the CC number is 5, the bit information of CIF=101 or later remains. In the communication control method according to the present invention, such bit information remaining in the CIF table is used as bit information for providing notification of CCs to which the PDSCHs are assigned.

That is, in the CIF table illustrated in FIG. 4, combinations of CCs are defined in the bit information with no CC defined, and the subject CCs are bundled to CCs to which the PDSCHs are assigned (this combining of CCs in which PDSCHs are transmitted is hereinafter referred to as "bundling"). For example, when the CC number is 2, at CIF=010, the CCs to which the PDSCHs are assigned are defined as CC0 and CC1 (in other words, CC0 and CC1 are bundled). Now, the example illustrated in FIG. 3 is of this case. And, when the CC number is 3, at CIF=011, the CCs to which the PDSCHs are assigned are defined as CC0 and CC1, and at CIF=100, the CCs to which the PDSCHs are assigned are defined as CC0 and CC2. At CIF=101, the CCs to which the PDSCHs are assigned are defined as CC1 and CC2. Further, when the CC number is 3, at CIF=110, the CCs to which the PDSCHs are assigned are defined as CC0, CC1 and CC2.

Here, the CC combinations can be indicated by three bits for the CC number 2 and 3. However, for the CC number 4 and 5, four bits are required for defining all CC combinations, and the bits are deficient in number. Therefore, when the CC number is 4, the bundled-CC sets $N_1$ to $N_4$ are defined in the bit information of CIF=100 or later. Here, the bundled-CC sets $N_1$ to $N_4$ may be notified of to the mobile station apparatus semi-statically by RRC signaling or defined in the initial setting.

As the bit information corresponding to a bundled-CC set makes up the CIF, this CIF is added to the DCI, which is then included in the PDCCH in this way, in the mobile station apparatus, it is possible to recognize the plural CCs to which the PDSCHs for the subject apparatus are assigned by decoding this CIF. With this method, as it is possible to notify the mobile station apparatus of the two or more CCs to which the PDSCHs are assigned with use of a single PDCCH, even when the plural CCS are aggregated into a wide band, it is possible to reduce the radio resources allocated to the PDCCHs, thereby improving the date rate.

In the base station apparatus according to the present invention, such a CIF is used to provide notification of plural CCs to which the PDSCHs are assigned, thereby realizing reduction in radio resources allocated to the PDCCHs and increase in data rate. However, if the plural CCs to which the PDSCHs are assigned are notified of in this way, the fields of the downlink control information (DCI) contained in the PDCCH need to be standardized (made common) partially or entirely. This is because DCI, which is conventionally transmitted in plural PDCCHs, is transmitted by a single PDCCH.

For this reason, in the base station apparatus according to the present invention, there are considered the following options: i) using information of all the fields of the DCI in common, ii) using information of all the field other than the RA (Resource Allocation) field of the DCI in common, and iii) using information of some fields other than the RA field of the DCI in common. In this way, the fields of the DCI are made common partially or entirely, DCIs conventionally transmitted in plural PDCCHs can be transmitted in a single PDCCH. Here, the above options ii) and iii) may be combined to standardize certain fields of the DCI.

Figure 5A:
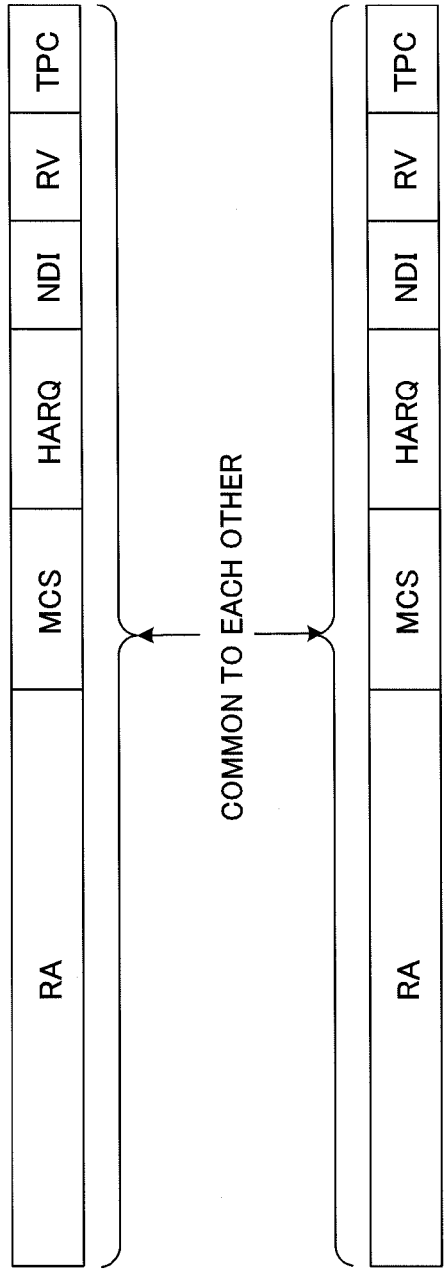
FIG. 5 provides diagrams for explaining DCI fields used in common in the above-mentioned base station apparatus.
Figure 5B:
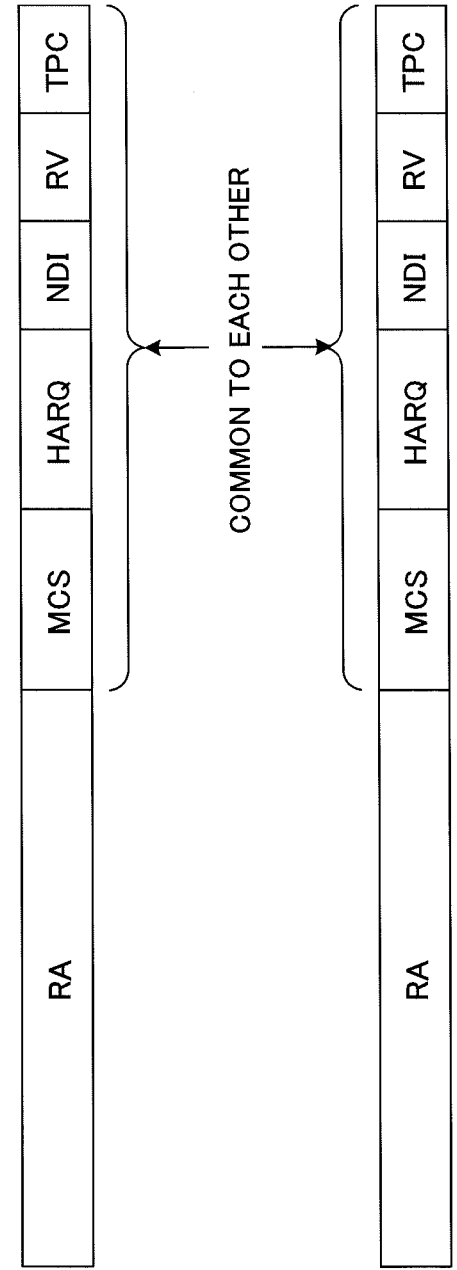

FIG. 5 provides diagrams for explaining DCI fields used in common in the base station apparatus according to the present invention. FIG. 5A shows the case where information of all the fields of the DCI is used in common (the above option i)) and FIG. 5B shows the case where information of all the fields other than RA field of the DCI is used in common (the above option ii)).

As illustrated in FIG. 5, DCI contains fields for determining resource allocation information (RA) determined per mobile station apparatus, MCS (modulation and coding scheme) information, HARQ information, identifier to determine whether data is new data or retransmission data (NDI: New data indicator), RV (Redundancy Version), TPC (transmission power control) command of PUCCH (Physical Uplink Control CHannel) and the like.

In the method illustrated in FIG. 5A, the information of all the fields contained in the DCI is used in common. That is, information of all the fields contained in the DCI is made common irrespective of the number of PDSCHs assigned to the plural CCs. As the information of all the fields contained in the DCI is made common in this way, it is possible to notify the mobile station apparatus of the CCs to which the PDSCHs are assigned with use of the bit information of the CIF, without performing processing such as compression on the information of the respective fields of the DCI. However, in this case, as the information of each field is designated without considering transmission path quality of the plural CCs, the data rate may be reduced as compared with the case where the PDCCH for demodulating the PDSCH is assigned on a per-CC basis.

In the method illustrated in FIG. 5B, the information of the fields other than the RA field contained in the DCI is made common. That is, the information of the RA field contained in the DCI is designated for each of the PDSCHs assigned to the plural CCs independently. In this case, the information of the RA field (resource allocation information) can be assigned in consideration of the transmission path quality of each CC. Therefore, though the information of the RA field needs to be subjected to processing such as compression, but as the information of the RA field is assigned in consideration of the transmission path quality of the plural CCs, it is possible to allocate the resource in accordance with the transmission path quality of each of the CCs, thereby making it possible to notify the mobile station apparatus of the plural CCs to which the PDSCHs are assigned with use of the CIF bit information, while preventing reduction in data rate.

Although it is not illustrated, in the above option ii), the information of some fields other than the RA field of the DCI is made common. That is, information of some fields other than the RA field contained in the DCI is designated for each of the PDSCHs assigned to the CCs, independently. For example, when the information of the fields other than the MCS field is made common, the information of the MCS field can be designated in consideration of transmission path quality of each CC. Therefore, though the information of the MCS field needs to be subjected to compression or the like, as the information of the MCS field can be designated in consideration of the transmission path quality of each CC, it is possible to select an MCS in accordance with the transmission path quality of each CC, thereby making it possible to provide notification of plural CCs to which PDSCHs are assigned with use of CIF bit information, while suppressing reduction in data rate.

Besides, as to the field that is not made common, that is, the field that is provided corresponding to each of the PDSCHs assigned to CCs, it is possible to reduce or decrease information of certain fields in accordance with the importance. For example, as to a TPC command designated in the TPC field, if it is required of a primary CC mainly used in transmission of a PDSCH (not required of CCs other than the primary CC), the TPC field may be used as an individual field for another field (for example, NDI field). Further, it is also possible to reduce the number of bits assigned to the RA field and use it as an individual field of another field (for example, HARQ field).

Further, in this description, it is assumed that a transport block that makes up a retransmission block is mapped on a per-CC basis. However, mapping of the transport block is by no means limited to this way. For example, the present invention is also applicable to the way to map the transport block over plural CCs. In such a case, it is possible to make the HARQ field of the DCI common.

Here, description is made about the compression method of the information of the RA field that is required for assigning the RA field information (resource allocation information) in consideration of the transmission path quality of each CC. FIG. 6 provides diagrams for explaining the method for compressing the RA field information of the DCI in the base station apparatus according to the present invention. FIG. 6A illustrates the DCI before the RA field information is compressed, and FIG. 6B illustrates the DCi after the RA field information is compressed.

Compression of the RA field can be realized, for example, by, when allocating resources to a mobile station apparatus, increasing the size of a resource block group (RBG) to be larger than the size of the RBG where the DCI (PDCCH) is generated for each of PDSCHs allocated to CCs. In FIG. 6, the RBG size is made twice as large when allocating resources to the mobile station apparatus.

As illustrated in FIG. 6A, it is assumed that the RA field information (resource allocation information) in the size of the RBG before change is of 10 bits. In this case, when the RBG size is twice as large, the RA field information can be designated with 5 bits as illustrated in FIG. 6B. Therefore, the RA field information is to be compressed by 5 bits. For example, when the CC number is 2, it is possible that the resource allocation information of the PDSCH of one CC is designated to the compressed five bits and the resource allocation information of the PDSCH of the other CC is designated to the other five bits newly formed by compression.

In this way, as the RA field information is compressed, it is possible to assign the resource allocation information in consideration of transmission path quality of each of CCs to the RA field. This makes it possible to notify the mobile station apparatus of plural CCs to which the PDSCHs are assigned with use of CIF bit information, while suppressing reduction in data rate.

Here, the compression method of the RA field information has been described on the assumption that the DCI formats are equal to each other (equal in transmission mode and bandwidth), however, this compression method is also applicable when different DCI formats are used. For example, where the DCI formats corresponding to plural CCs notified of by the CIF are different in bandwidth, the RA field information of a DCI format of broader bandwidth may be further compressed thereby to realize the present invention. Besides, where the DCI formats corresponding to CCs notified of by the CIF are different in transmission mode, it is preferable that the DCI formats are made to conform to the DCI format of larger size (number of bits).

Up to this point, description has been made about the method of bundling a plurality of CCs by assigning the CCs to bit information of a CIF and providing notification of the CCs to which PDSCHs are assigned with use of a single PDCCH. In the communication control method according to the present invention, this method of providing notification of plural CCs to which PDSCHs are assigned may be replaced, or may be added with, the method of bundling two or more subframes by assigning the subframes to bit information of a CIF and providing notification of the subframes to which PDSCHs are assigned. With this method, it is possible to notify the mobile station apparatus of the plural PDSCHs assigned not only to different CCs, but also to different subframes, with use of a single PDCCH, thereby making it possible to reduce the radio resources allocated to the PDSCHs and further improve the data rate even when the plural CCs are aggregated into a wide band.

FIG. 7 provides diagrams for explaining the method of provide notification of CCs and/or subframes to which PDSCHs are assigned with use of a CIF in the base station apparatus according to the present invention. In FIG. 7, there are shown radio resources of two subframes in the system band made up of two CCs. In the following description, for convenience of explanation, bundling of plural CCs by assigning the CCs to bit information of a CIF is referred to as "CC bundling" and bundling of plural subframes by assigning the subframes to bit information of a CIF is referred to as "subframe bundling"

In the subframe bundling, for example, in the CIF table illustrated in FIG. 4, the bit information of CIF=011 or later when the CC number is 2 is used. For the subframe bundling, for example, it is assumed that the subframe of the same CC as the PDCCH and its following subframe are bundled (see FIG. 7B). And, where the CC bundling and the subframe bundling are combined, for example, the same CC as the PDCCH is bundled with its adjacent CC and a subframe of these CCs and its following subframe are bundled (see FIG. 7D).

FIG. 7A illustrates the case of providing notification of a plurality of CCs to which plural PDSCHs are assigned with use of a single PDCCH by CC bundling. FIG. 7B illustrates the case of providing notification of a plurality of subframes to which plural PDSCHs are assigned with use of a single PDCCH by subframe bundling. FIGS. 7C and 7D illustrate the cases of providing notification of plural CCs and plural subframes to which plural PDSCHs are assigned with use of a single PDCCH by CC bundling and subframe bundling. In the following description, for convenience of explanation, it is assumed that the PDCCH is assigned to the CC0.

In FIG. 7A, at the subframe 0, CIF=010, two PDSCHs are assigned to the same CC (CC0) as the PDCCH and its adjacent CC (CC1), and at the subframe 1, CIF=001, one PDSCH is assigned to an adjacent CC (CC1) to the CC of the PDCCH. In this way, as the bundled CCs are notified of by the CIF added to the PDCCH, it is possible in the mobile station apparatus to identify the CCs to which the PDSCHs are assigned for the subject apparatus by decoding the CIF.

In FIG. 7B, at CIF=001, the PDSCHs are assigned to the subframe (subframe 0) of the same CC as the PDCCH and its following subframe (subframe 1) (also of the same CC as the PDCCH). As the bundled subframes are thus notified of by the CIF added to the PDCCH, it is possible in the mobile station apparatus, to identify the plural subframes to which the PDSCHs are assigned for the subject apparatus by decoding the CIF. This makes it possible to notify the mobile station apparatus of the two or more subframes to which the PDSCHs are assigned by a single PDCCH, thereby reducing radio resource allocated to PDCCHs and improving the data rate even when a plurality of CCs are aggregated into a wide band.

In FIG. 7C, at CIF=100, the PDSCHs are assigned to the same CC (CC0) as the PDCCH, its adjacent CC (CC1) and to a following subframe (subframe 1) of the same CC (CC0) as the PDCCH.

Besides, in FIG. 7D, at CIF=101, the PDSCHs are assigned to the same CC (CC0) as the PDCCH and its adjacent CC (CC1) and to the same CC (CC0) of the PDCCH and its adjacent CC (CC1) of a subsequent subframe (subframe 1). As the bundled CCs and the bundled subframes are thus notified of by the CIF added to the PDCCH, it is possible in the mobile station apparatus to identify the CCs and subframes to which the PDSCHs are assigned for the subject apparatus by decoding the CIF. This makes it possible to notify the mobile station apparatus of the two or more CCs and subframes to which the PDSCHs are assigned by a single PDCCH, thereby reducing radio resource allocated to PDCCHs and improving the data rate even when a plurality of CCs are aggregated into a wide band.

Now, when the plural PDSCHs are transmitted in different CCs or subframes by CC bundling and subframe bundling like in the above-described examples, there may arise a situation that any of the PDSCHs are not received properly by the mobile station apparatus. For example, when the PDSCHs are transmitted in two CCs by CC bundling, the PDSCH of one CC may be received properly and the PDSCH of the other CC may not be received properly. In this case, in the base station apparatus according to the present invention, the PDSCH which was not received can be re-transmitted in response to an ACK/NACK signal from the mobile station apparatus.

FIG. 8 provides diagrams for explaining the method for retransmitting PDSCHs in the base station apparatus according to the present invention. In FIG. 8A, at CIF=010, two PDSCHs (PDSCH1, PDSCH2) are assigned to the same CC (CC0) as the PDCCH and its adjacent CC (CC1) and transmitted. Here, it is assumed that in the mobile station apparatus, the PDSCH1 could be received properly and the PDSCH2 could not be received properly. It is also assumed that the mobile station apparatus transmits, in response, ACK/NACK signals independently for the respective PDSCHs. In this case, an ACK signal is transmitted for the PDSCH1 and a NACK signal is transmitted for the PDSCH2.

When the ACK/NACK signals are thus transmitted respectively, in the base station apparatus according to the present invention, the CIF bit information is changed and only the PDSCH which could not been received properly is retransmitted in the same CC as the previous one. In the example of FIG. 8, as illustrated in FIG. 8B, at CIF=001, the PDSCH2 is retransmitted only in the CC1. Thus, in the base station apparatus according to the present invention, the CIF bit information can be changed to retransmit only the PDSCH2, which was not received properly, it is possible to efficiently transmit the PDSCH2 required of the mobile station apparatus.

Here, description is made by way of the example where the CIF bit information is changed and the PDSCH2 is only retransmitted in the same CC1 as the previous one. However, the PDSCH2 can be retransmitted in the same CC as the previous one without change to the CIF bit information. For example, it can be assumed that at CIF=010, a new PSDCH is transmitted in the CC0 while the PDSCH2 is retransmitted in the CC1. In this case, as not only the PDSCH2, which needs to be retransmitted, but also the new PDSCH can be transmitted, it is possible to improve the data rate while transmitting the PDSCH2 required of the mobile station apparatus.

In the mobile station apparatus according to the present invention, as the NACK signal is transmitted when all the PDSCHs are not received properly, that is, an ACK/NACK signal is transmitted for a set of plural PDSCHs, it is possible to reduce uplink ACK/NACK signals. In this case, in the base station apparatus which has received a NACK signal, the bit information of the CIF is maintained and all the PDSCHs are re-transmitted in the same CCs as previous ones.

The following description is made in detail about an embodiment of the present invention, with reference to the accompanying drawings. Here, it is assumed that a base station apparatus (hereinafter referred to as "base station") and a mobile station apparatus (hereinafter referred to as "mobile station") both support the LTE-A system.

Figure 9:
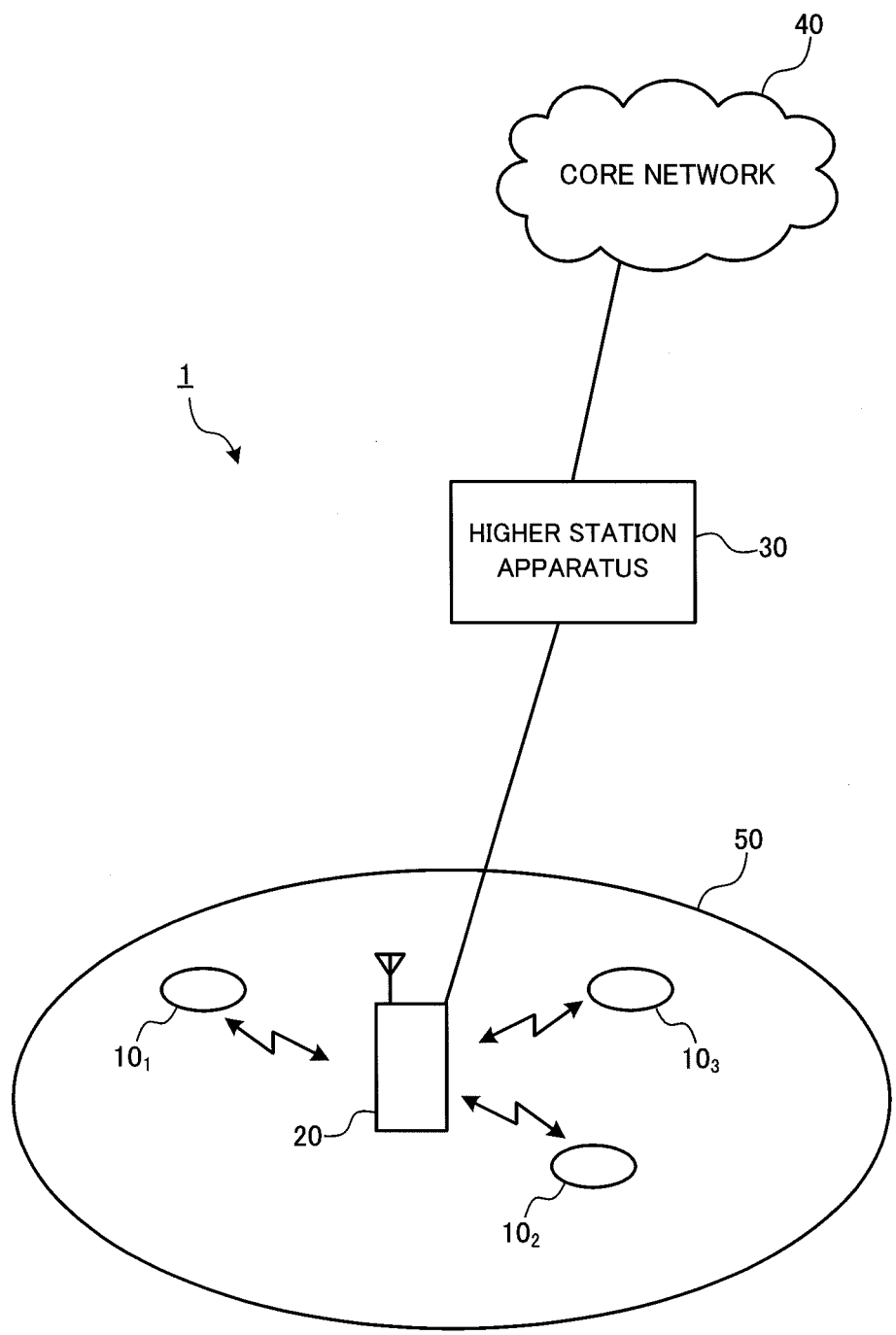
FIG. 9 is an overall view of a mobile communication system according to an embodiment of the present invention.

With reference to FIG. 9, description is made about a mobile communication system 1 having a base station 20 and mobile stations 10 according to the present embodiment. FIG. 9 is a diagram for explaining the configuration of the mobile communication system 1 having the base station 20 and mobile stations 10 according to the present embodiment. The mobile communication system 1 illustrated in FIG. 9 is a system comprising, for example, the LTE system or SUPER 3G. Besides, this mobile communication system 1 may be referred to as "IMT-Advanced" or "4G".

The mobile communication system 1 is configured to include the base station 20 and a plurality of mobile stations 10 ($10_1$, $10_2$, $10_3$, . . . ) that communicate with this base station 20. The base station 20 is connected with a higher station apparatus 30, and this higher station apparatus 30 is connected with a core network 40. The mobile stations 10 communicate with the base station 20 in a cell 50. The higher station apparatus 30 includes, for example, an access gateway apparatus, a radio network controller (RNC), a mobility management entity (MME) and so on, but is by no means limited to these.

The mobile stations ($10_1$, $10_2$, $10_3$, . . . $10_n$) have the same configurations and functions, so that the following descriptions will be given with respect to "mobile station 10," unless specified otherwise. Also, although the mobile station 10 performs radio communication with the base station 20 for ease of explanation, more generally, user apparatuses (UE: User Equipment) including mobile stations and fixed terminal apparatuses may be used.

In the radio communication system 1, as radio access schemes, OFDMA (Orthogonal Frequency Division Multiple Access) is applied to the downlink, and SC-FDMA or clustered DFT-spread OFDM is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands. Clustered DFT-spread OFDM is a scheme to realize uplink multiple access by assigning a group (cluster) of discontinuous clustered subcarriers to one mobile station UE and applying discrete Fourier transform-spread OFDM to each cluster.

Here, the communication channels in the LTE/LTE-A systems will be described. The downlink communication channels include the PDSCH, which is used by each mobile station 10 on a shared basis, and downlink control channels (including the PDCCH, PCFICH and PHICH). The downlink control channel may be referred to as a downlink L1/L2 control channel. The PDSCH transmits user data (including higher control signals), that is, normal data signals. Transmission data is contained in this user data.

As for uplink, a PUSCH, which is used by each mobile station 10 on a shared basis, and a PUCCH, which is an uplink control channel. This PUSCH is used to transmit user data. And, the PUCCH is used to transmit UL ACK/NACK, downlink radio quality information (CQI: Channel Quality Indicator) and so on.

Figure 10:
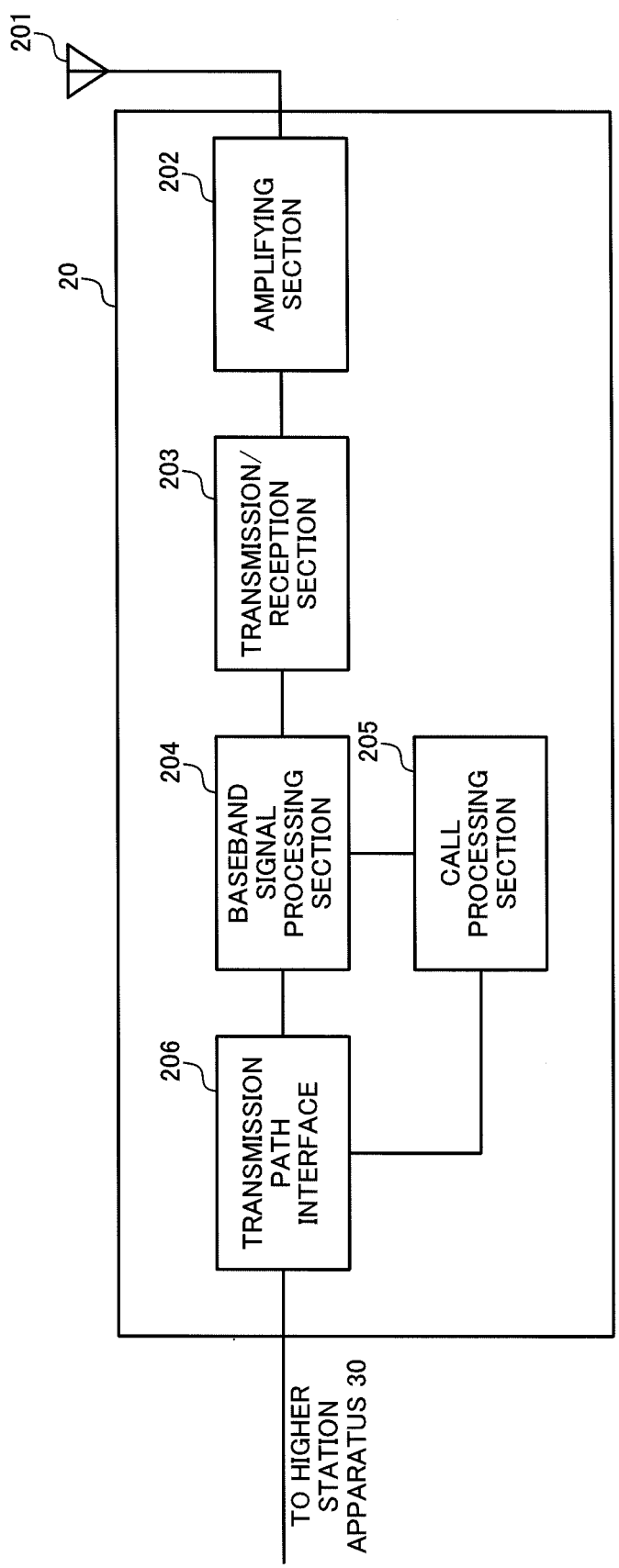
FIG. 10 is a diagram for schematically illustrating a configuration of the base station apparatus according to the above-mentioned embodiment.

FIG. 10 is a diagram schematically illustrating the configuration of the base station 20 according to the present invention. As illustrated in FIG. 10, the base station 20 has a transmitting/receiving antenna 201, an amplifying section 202, a transmission/reception section 203, a baseband signal processing section 204, a call processing section 205 and a transmission path interface 206.

User data that is transmitted on the downlink from the base station 20 to the mobile station 10 is input in the baseband signal processing section 204, through the transmission path interface 206, from the higher station apparatus 30 positioned at a higher level above the base station 20.

In the baseband signal processing section 204, a downlink data channel signal is subjected to PDCP layer processing such as addition of a sequence number, RLC (Radio Link Control) layer transmission processing such as RLC retransmission control transmission processing and division and coupling of user data, MAC (Medium Access Control) retransmission control, including, for example, HARQ transmission processing, scheduling, transport format selection, channel coding, inverse fast Fourier transform (IFFT) processing, and precoding processing. Then, the signal is transferred to the transmission/reception section 203. Further, as with signals of the downlink control channel, such a signal is subjected to transmission processing such as channel coding and inverse fast Fourier transform, and is transferred to the transmission/reception section 203.

The baseband signal processing section 204 notifies the mobile station 10 of control information for communication in the cell 50 by a broadcast channel. Broadcast information for communication in the cell 50 includes, for example, the uplink or downlink system bandwidth, identification information of a root sequence (root sequence index) for generating random access preamble signals in the PRACH, and so on.

In the transmission/reception section 203, the baseband signal output from the baseband signal processing section 204 is subjected to frequency conversion processing into a radio frequency band. The signal is then amplified by the amplifying section 202 and transmitted by the transmitting/receiving antenna 201.

Meanwhile, in the base station 20, a radio frequency signal transmitted from the mobile station 10 is received by the transmitting/receiving antenna 201. The radio frequency signal received by the transmitting/receiving antenna 201 is then amplified by the amplifying section 202, frequency-converted into a baseband signal by the transmission/reception section 203 and is input to the baseband signal processing section 204.

The baseband signal processing section 204 performs FFT processing, IDFT processing, error correction decoding, MAC retransmission control reception processing, and RLC layer and PDCP layer reception processing on the user data included in the received baseband signal. The signal is then, transferred to the higher station apparatus 30 through the transmission path interface 206.

The call processing section 205 performs call processing such as setting up and releasing a communication channel, manages the state of the base station 20 and manages the radio resources.

Figure 11:
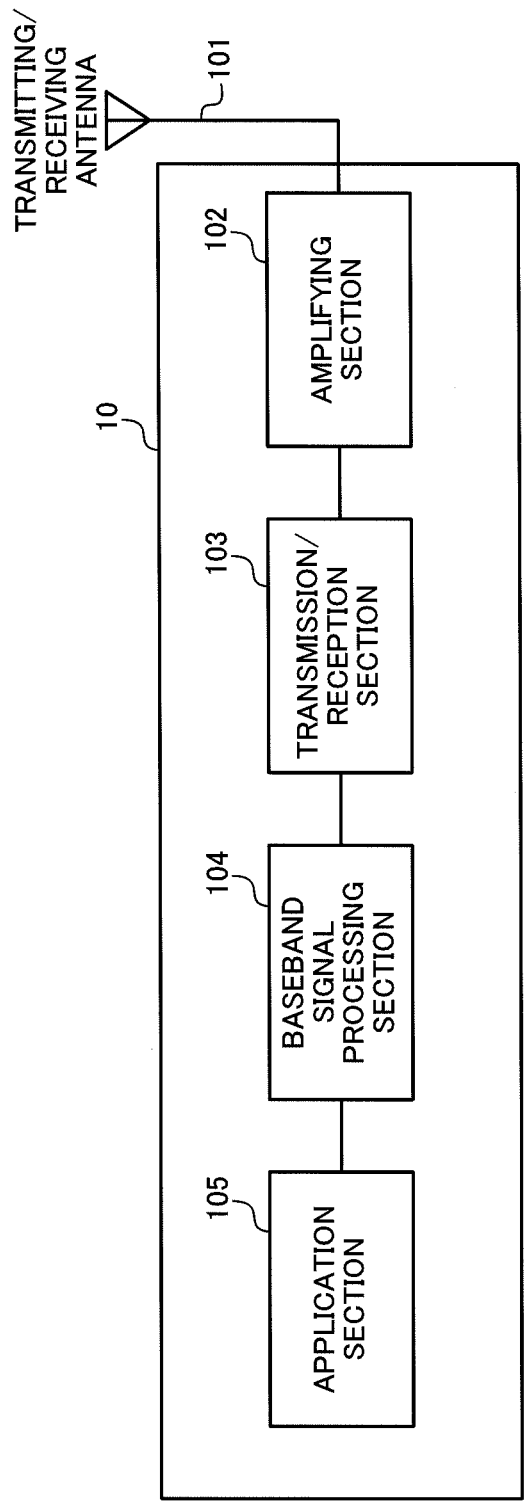
FIG. 11 is a diagram for schematically illustrating a configuration of a mobile station apparatus according to the above-mentioned embodiment.

FIG. 11 is a diagram schematically illustrating the configuration of the mobile station 10 according to the present embodiment. As illustrated in FIG. 11, the mobile station 10 has a transmitting/receiving antenna 101, an amplifying section 102, a transmission/reception section 103, a baseband signal processing section 104 and an application section 105.

In reception, a radio frequency signal is received by the transmitting/receiving antenna 101, amplified by the amplifying section 102 and frequency-converted into a baseband signal by the transmission/reception section 103. This baseband signal is subjected to reception processing such as FFT processing, error correction decoding and retransmission control and so on, in the baseband signal processing section 104. In this downlink data, downlink user data is transferred to the application section 105. The application section 105 performs processing related to higher layers above the physical layer and the MAC layer. In the downlink data, broadcast information is also transferred to the application section 105.

On the other hand, in transmission, uplink user data is input from the application section 105 to the baseband signal processing section 104. In the baseband signal processing section 104, retransmission control (HARQ (Hybrid ARQ)) transmission processing, channel coding, DFT processing, IFFT processing and so on are performed. The signal is then transferred to the transmission/reception section 103. In the transmission/reception section 103, the baseband signal output from the baseband signal processing section 104 is subjected to frequency conversion processing and converted into a radio frequency band. After that, the signal is amplified in the amplifying section 102 and transmitted from the transmitting/receiving antenna 101.

Figure 12:
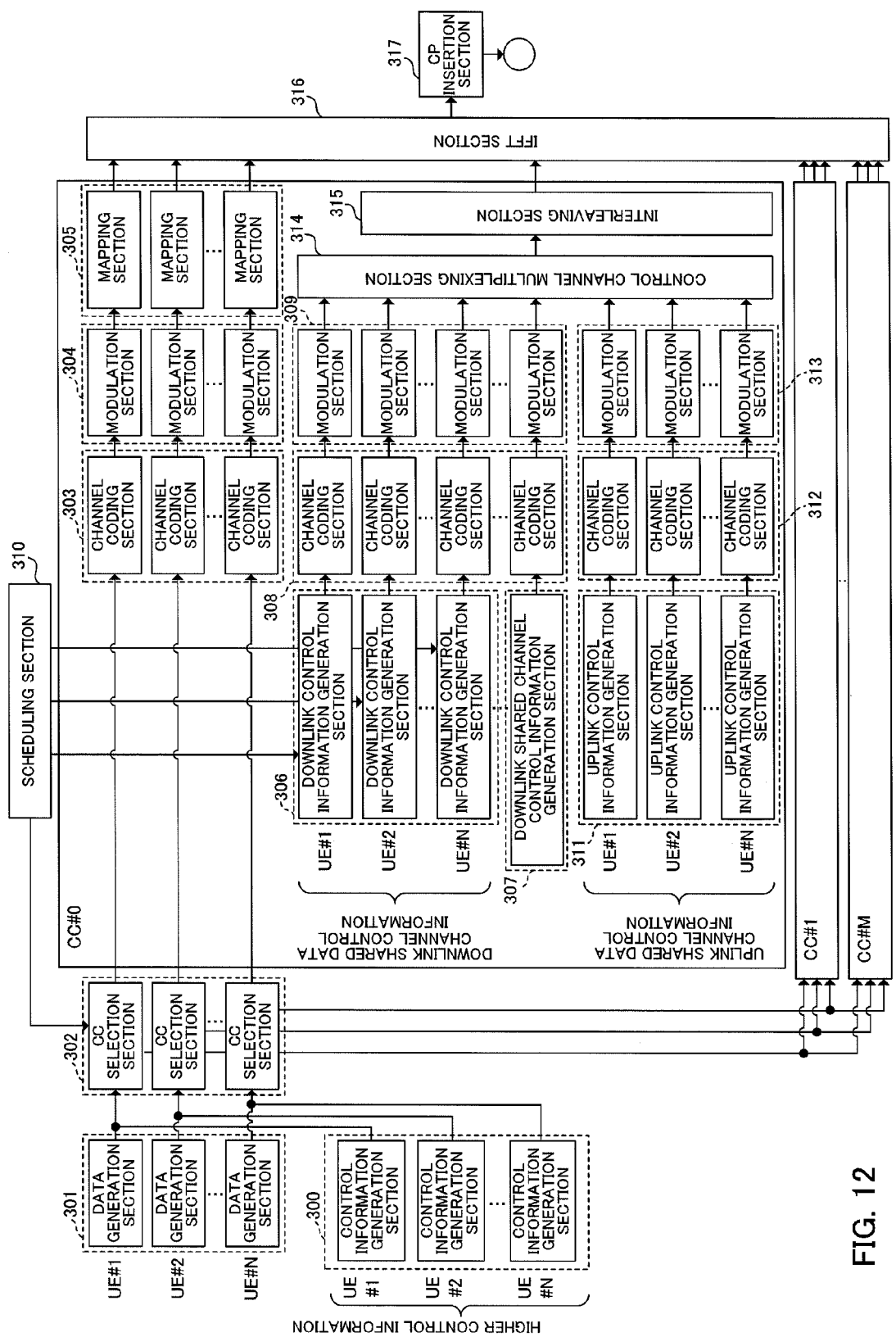
FIG. 12 is a functional block diagram of a transmission processing section in a baseband signal processing section of the base station apparatus according to the above-mentioned embodiment.

FIG. 12 is a functional block diagram of the baseband signal processing section 204 and part of the higher layers provided in the base station apparatus 20 according to the present embodiment, and primarily illustrates the functional blocks of the transmission processing section in the baseband signal processing section 204. FIG. 12 illustrates an example of a base station configuration which can support maximum M (CC #0 to CC #M) component carriers. Transmission data for the mobile station 10 under control of the base station 20 is transferred from the higher station apparatus 30 to the base station 20.

A control information generation section 300 generates a higher control signal for performing higher layer signaling (for example, RRC signaling), on a per-user basis. In the CIF table illustrated in FIG. 4, when the number of CCs available for radio communication is 4 or 5, the control information generation section 300 can generate a higher control signal containing a command to designate one of bundled-CC sets $N_1$ to $N_4$. Here, the higher control signal containing the command to designate one of bundled-CC sets $N_1$ to $N_4$ is equivalent to block identification information in the claims, and the control information generation section 300 is equivalent to a block designation information generation section.

A data generation section 301 outputs the transmission data transferred from the higher station apparatus 30 as user data on a per-user basis.

A component carrier selection section (CC selection section) 302 selects component carriers to use in radio communication with the mobile station 10 on a per-user basis. Specifically, the CC selection section 302 selects one or more CCs on a per-user basis based on the information from a scheduling section 310. Based on the assignment information of CCs set on a per-user basis by the CC selection section 302, higher control signals and transmission data are assigned to channel coding sections 303 of respective CCs.

The scheduling section 310 controls assignment of CCs to a serving mobile station 10 in accordance with overall communication quality of the system band. Specifically, the scheduling section 310 determines the number of CCs and CC positions allocated to communication with the mobile station 10. A determination result of the number of CCs and CC positions is communicated to the control information generation section 300 and the CC selection section 302. In the uplink scheduling, either SC-FDMA or clustered DFT-spread OFDM is controlled dynamically (on a per-subframe basis). In CCs (uplink) to which clustered DFT-spread OFDM is applied, the number of clusters and cluster resources are determined.

Besides, the scheduling section 310 controls resource allocation in each of CC #0 to CC #M. For example, in the scheduling section 310, the LTE terminal user and the LTE-A terminal user are scheduled separately. The scheduling section 310 receives as input the transmission data and retransmission command from the higher station apparatus 30, and also receives as input the channel estimation values and resource block CQIs from the reception section having measured an uplink received signal. The scheduling section 310 schedules downlink allocation information, uplink allocation information and uplink and downlink shared channel signals, with reference to the retransmission instruction, channel estimation values and CQIs that are received as input from the higher station apparatus 30.

A propagation path in mobile communication varies differently per frequency, due to frequency selective fading. So, upon transmission of user data to the mobile station 10, resource blocks of good communication quality are assigned to each mobile station 10, on a per-subframe basis (which is referred to as "adaptive frequency scheduling"). In adaptive frequency scheduling, for each resource block, a mobile station 10 of good propagation path quality is selected and assigned. Consequently, the scheduling section 310 assigns resource blocks that are expected to have improved throughput, using the CQI of each resource block, fed back from each mobile station 10. Besides, it assigns resource blocks to the uplink to which the clustered DFT-spread OFDM is applied, on a per-cluster basis. Further, the MCS (coding rate and modulation scheme) to fulfill a required block error rate with the assigned resource blocks is determined. Parameters to fulfill the MCS (coding rate and modulation scheme) determined by the scheduling section 310 are set in channel coding sections 303, 308 and 312, and in modulation sections 304, 309 and 313.

The baseband signal processing section 204 has channel coding sections 303, modulation sections 304, and mapping sections 305, to match the maximum number of users to be multiplexed, N, in one component carrier. The channel coding section 303 performs channel coding of the shared data channel (PDSCH), which is formed with user data (including part of higher control signals) that is output from the data generation section 301, on a per-user basis. The modulation section 304 modulates user data having been subjected to channel coding, on a per-user basis. The mapping section 305 maps the modulated user data to radio resources. Here, a transmission system elements including these channel coding sections 303, modulation sections 304, and mapping sections 305 make up a second transmission section for transmitting data channels containing the block designation information in the claims.

Further, the baseband signal processing section 204 has a downlink control information generation section 306 that generates downlink shared data channel control information, which is user-specific downlink control information, and a downlink shared channel control information generation section 307 that generates downlink shared control channel control information, which is user-common downlink control information. Here, the downlink control information generation section 306 constitutes a downlink control information generation section in the claims.

The downlink control information generation section 306 generates downlink control information (DCI) from the resource allocation information, MCS information, HARQ information, PUCCH transmission power control command and the like, which are determined on a per-user basis. Also, the downlink control information generation section 306 determines a CIF to be added to the downlink control information (DCI) based on the CIF table illustrated in FIG. 4. For example, when a plurality of CCs is used for transmission of the PDSCHs for the mobile station 10 where the number of CCs available for radio communication is 2, CIF=010 is determined and the downlink control information (DCI) is generated with this CIF added thereto. Further, when a plurality of CCs is used for transmission of PDSCHs for the mobile station 10, the downlink control information generation section 306 generates the downlink control information (DCI) in which the fields are made partially or entirely in common, as illustrated in FIG. 5. Here, some or all of the field standardized in the DCI are determined, for example, based on previous setting or the scheduling information from the scheduling section 310. For example, the information of the fields other than the RA field contained in the DCI is made common, the downlink control information generation section 306 performs compression of the RA field information as illustrated in FIG. 6. And, the information of some of the fields other than the RA field in the DCI (for example, information of the fields other than the MCS field) is made common, the downlink control information generation section 306 performs processing such as compression of the MCS field information.

The baseband signal processing section 204 has channel coding sections 308 and modulation sections 309 to match the maximum number of users to be multiplexed, N, in one component carrier. The channel coding section 308 performs, on a per-user basis, channel coding of control information, which is generated in the downlink control information generation section 306 and the downlink shared channel control information generation section 307. The modulation section 309 modulates the downlink control information having been subjected to channel coding. Here, the transmission system elements including these channel coding sections 308 and modulation sections 309 constitute a transmission section for transmitting a downlink control channel (PDCCH) in the claims.

Also, the baseband signal processing section 204 has an uplink control information generation section 311, a channel coding section 312, and a modulation section 313. The uplink control information generation section 311 generates, on a per-user basis, uplink shared data channel control information, which is control information for controlling the uplink shared data channel (PUSCH). The channel coding section 312 performs, on a per-user basis, channel coding of generated uplink shared data channel control information, and the modulation section 313 modulates the uplink shared data channel control information having been subjected to channel coding, on a per-user basis.

The uplink control information generation section 311 generates the uplink control information from the uplink resource allocation information (cluster), MCS information and redundancy version (RV), identifier to determine whether it is new data or retransmission data (new data indicator), PUSCH transmission power control command (TPC), cyclic shift for demodulation reference signal (CS for DMRS), CQI request and the like, which are determined on a per-user basis. As for subframes (CCs) for which SC-FDMA is selected as the uplink radio access scheme, uplink allocation information of DCI Format 0 is generated in accordance with the rules defined in LTE.

The control information that is modulated on a per-user basis in the above modulation sections 309 and 313 is multiplexed in a control channel multiplexing section 314 and furthermore interleaved in an interleaving section 315. A control signal that is output from the interleaving section 315 and user data that is output from the mapping section 305 are input in an IFFT section 316 as downlink channel signals. The IFFT section 316 converts the downlink channel signal from a frequency domain signal into a time sequence signal by performing inverse fast Fourier transform of the downlink channel signal. A cyclic prefix insertion section 317 inserts cyclic prefixes in the time sequence signal of the downlink channel signal. Note that a cyclic prefix functions as a guard interval for cancelling the differences in multipath propagation delay. The transmission data to which cyclic prefixes are added, is transmitted to the transmission/reception section 203.

Figure 13:
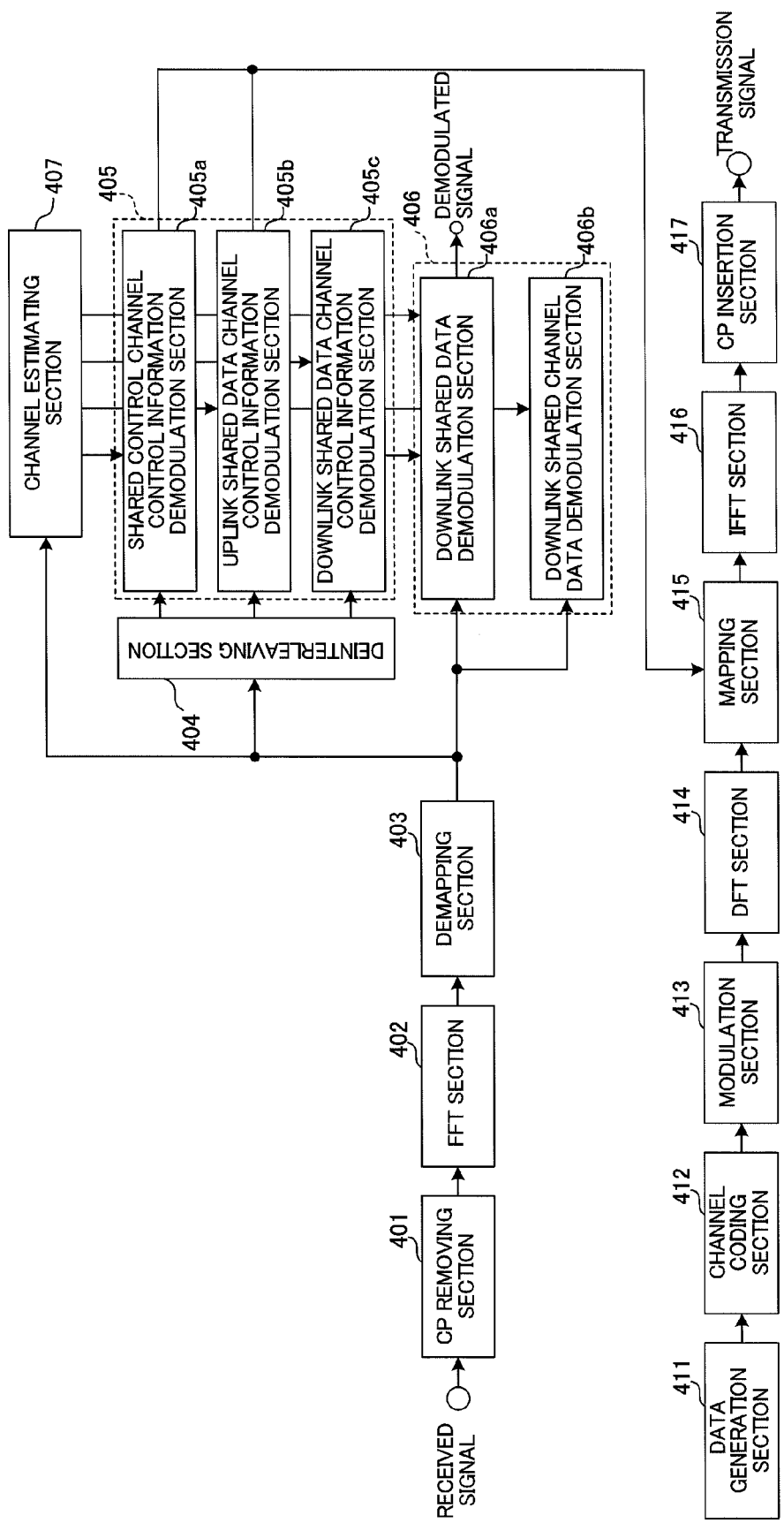
FIG. 13 is a functional block diagram of a baseband signal processing section provided in the mobile station apparatus according to the above-mentioned embodiment.

FIG. 13 is a functional block diagram of the baseband signal processing section 104 provided in the mobile station 10, and illustrates functional blocks of the LTE-A terminal that supports the LTE-A system.

A CP removing section 401 removes the CPs from a downlink signal received from the base station 20 as received data. The downlink signal, from which the CPs have been removed, is input in an FFT section 402. The FFT section 402 performs fast Fourier transform (FFT) on the downlink signal, converts the time domain signal into a frequency domain signal, and inputs the frequency domain signal into a demapping section 403. The demapping section 403 demaps the downlink signal, and extracts, from the downlink signal, multiplexed control information in which a plurality of pieces of control information are multiplexed, user data, and higher control signals. Note that the demapping processing by the demapping section 403 is performed based on a higher control signal that is received as input from the application section 105. The multiplexed control information that is output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405a that demodulates downlink shared control channel control information from the downlink control channel, an uplink shared data channel control information demodulation section 405b that demodulates uplink shared data channel control information by blind decoding search spaces from the downlink control channel, and a downlink shared data channel control information demodulation section 405c that demodulates downlink shared data channel control information by blind decoding of search spaces from the downlink control channel. The data demodulation section 406 includes a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is user-common control information, by the blind decoding processing, demodulation processing, channel decoding processing and so on of the common search spaces of the downlink control channel (PDCCH). The shared control channel control information includes downlink channel quality information (CQI), and therefore is input in a mapping section 415 (described later), and mapped as part of transmission data for the base station 20.

The uplink shared data channel control information demodulation section 405b extracts uplink shared data channel control information, which is user-specific uplink control information, by the blind decoding processing, demodulation processing, channel decoding processing and so on, of the user-specific search spaces of the downlink control channel (PDCCH). The uplink allocation information is used to control the uplink shared data channel (PUSCH), and is input to the downlink shared channel data demodulation section 406b.

The downlink shared data channel control information demodulation section 405c extracts downlink shared data channel control information, which is user-specific downlink control information, by the blind decoding processing, demodulation processing, channel decoding processing and so on of the user-specific search spaces of the downlink control channel (PDCCH). At this time, the downlink shared data channel control information demodulation section 405c decodes the CIF added to the DCI contained in the downlink control channel (PDCCH) thereby to obtain the information relating to the plural CCs to which the PDSCHs for the subject apparatus are allocated (downlink shared data channel control information). For example, when the number of CCs available for radio communication for the mobile station 10 is 2 and a decoding result of CIF=010 is obtained, the PDSCHs for the subject apparatus are recognized as being assigned to the same CC as the downlink control channel (PDCCH) and its adjacent CC. The downlink shared data channel control information is used to control the downlink shared data channel (PDSCH), and is input in the downlink shared data demodulation section 406a.

Also, the downlink shared data channel control information demodulation section 405c performs the blind decoding processing of the user-specific search spaces, based on information which relates to the PDCCH and PDSCH and which is included in higher control signals demodulated in the downlink shared data demodulation section 406a. The higher control signals are used to signal the information relating to the user-specific search spaces (that may contain activation "ON" and deactivation "OFF" of the PDSCH/PDCCH).

The downlink shared data demodulation section 406a acquires the user data and higher control information, based on the downlink shared data channel control information received as input from the downlink shared data channel control information demodulation section 405c. The higher control information (including mode information) is output to the channel estimation section 407. The downlink shared channel data demodulation section 406b demodulates downlink shared channel data based on the uplink shared data channel control information that is input from the uplink shared data channel control information demodulation section 405b.

The channel estimation section 407 performs channel estimation using common reference signals. The estimated channel variation is output to the shared control channel control information demodulation section 405a, the uplink shared data channel control information demodulation section 405b, the downlink shared data channel control information demodulation section 405c and the downlink shared data demodulation section 406a. These demodulation sections demodulate downlink allocation information using the estimated channel variation and demodulation reference signals.

The baseband signal processing section 104 has a data generation section 411, a channel coding section 412, a modulation section 413, a DFT section 414, a mapping section 415, an IFFT section 416, a CP insertion section 417, which are provided as transmission processing sequence functional blocks. The data generation section 411 generates transmission data from bit data that is received as input from the application section 105. The channel coding section 412 applies channel coding processing such as error correction and so on to the transmission data, and the modulation section 413 modulates the transmission data having been subjected to channel coding, by QPSK and so on. The DFT section 414 performs discrete Fourier transform on the modulated transmission data. The mapping section 415 maps each frequency component of data symbols having been subjected to the DFT processing, to a subcarrier designated by the base station apparatus. The IFFT section 416 performs inverse fast Fourier transform on the input data corresponding to the system band and converts it to time sequence data, and the CP insertion section 417 inserts cyclic prefixes into data breaks of the time sequence data.

The following description is made about the operation of transmitting PDSCHs to the mobile station 10 from the base station 20 configured as described above. In this case, in the base station 20, the downlink control information generation section 306 determines a CIF to be added to the downlink control information (DCI) based on the CIF table illustrated in FIG. 4. When a plurality of CCs are used for transmission of PDSCHs for the mobile station 10, a corresponding CIF (for example, CIF=010 illustrated in FIG. 4) is selected and the downlink control information (DCI) is generated with the CIF added thereto. Then, the downlink control channel (PDCCH) containing this downlink control information is transmitted to the mobile station 10 with the PDSCHs assigned to the plural CCs.

On the other hand, in the mobile station 10, the CIF added to the DCI contained in the downlink control channel is decoded thereby to identify the CCs to which the PDSCHs for the subject apparatus are assigned. After that, the PDSCHs assigned to the plural CCs are demodulated based on the information defined in the fields contained in this DCI thereby to reproduce the transmission data from the base station 20.

As described up to this point, according to the base station 20 to which the communication control method of the present embodiment is applied, the DCI is generated with addition of the CIF which is used to demodulate PDSCHs allocated to two or more CCs and is identification information capable of identify the CCs and a PDCCH is transmitted with this DCI. With this configuration, as there is no need to generate DCI for each CC and transmit a PDCCH with the DCI, it is possible to reduce radio resources allocated to the PDCCHs and improve the data rate, even when a plurality of CCs are aggregated into a wide band.

Up to this point, the present invention has been described in detail by way of the above-mentioned embodiment. It will be clear and apparent to one skilled in the art that the invention is not limited to the embodiments set forth in this description. The present invention may be embodied in various modified and altered forms without departing from the spirit and scope of the present invention defined in the claims. Therefore, this description has been given only for illustrative purposes and is not intended for limiting the present invention.

INDUSTRIAL APPLICABILITY

According to the present invention, it is possible to reduce radio resources allocated to PDCCHs by transmitting, to a mobile station 10, a PDCCH containing DCI added with a CIF that is used for demodulating PDSCHs allocated to two or more CCs and is capable of identifying the CCs. Therefore, the present invention is useful for radio communication systems for performing communications with use of a system band widened by aggregating a plurality of CCs.

The disclosure of Japanese Patent Application No. 2010-141018, filed on Jun. 21, 2010, including the specification, drawings, and abstract, is incorporated herein by reference in its entirety.

The invention claimed is:

1. A base station apparatus comprising:
a downlink control information generation section configured to generate downlink control information to demodulate data channels that are sent independently in respective fundamental frequency blocks allocated to a user terminal; and
a transmitting section configured to transmit a downlink control channel containing the downlink control information,
wherein the downlink control information generated by the downlink control information generation section is used to demodulate the data channels assigned to the fundamental frequency blocks and is added with identification information that is capable of identifying each frequency of the fundamental frequency blocks,
wherein each of the fundamental frequency blocks is a component carrier (CC) having a predetermined frequency band, and
wherein the downlink control information generation section makes all information pieces in the downlink control information in common irrespective of a number of the data channels assigned to the fundamental frequency blocks.

2. The base station apparatus of claim 1, wherein the downlink control information generation section generates the downlink control information added with identification information that is used to demodulate a plurality of data channels assigned to subframes and is capable of identifying each of the subframes, instead of the identification information that is capable of identifying each of the fundamental frequency blocks to which the data channels are as signed.

3. The base station apparatus of claim 1, wherein the downlink control information generated by the downlink control information generation section is added with identification information that is capable of identifying each of subframes to which the data channels are assigned, as well as each of the fundamental frequency blocks to which the data channels are as signed.

4. The base station apparatus of claim 1, further comprising a block designation information generation section configured to generate block designation information for designating a combination of fundamental frequency blocks to which the data channels are assigned when a number of the fundamental frequency blocks allocated to the user terminal is a predetermined number or more; and a second transmission section configured to transmit a data channel containing the block designation information.

5. A communication control method comprising:
a generating step of generating downlink control information to demodulate data channels that are sent independently in respective fundamental frequency blocks allocated to a user terminal; and
a transmitting step of transmitting a downlink control channel containing the downlink control information,
wherein the downlink control information generated in the generating step is used to demodulate the data channels assigned to the fundamental frequency blocks and is added with identification information that is capable of identifying each frequency of the fundamental frequency blocks,
wherein each of the fundamental frequency blocks is a component carrier (CC) having a predetermined frequency band, and
wherein the downlink control information generation section makes all information pieces in the downlink control information in common irrespective of a number of the data channels assigned to the fundamental frequency blocks.

6. The base station apparatus of claim 1, wherein the transmitting section transmits the downlink control channel of one of the fundamental frequency blocks carrying the data channels by using another fundamental frequency block.

7. The communication control method of claim 5, wherein in the transmitting step, the downlink control channel of one of the fundamental frequency blocks carrying the data channels is transmitted using another fundamental frequency block.

* * * * *